United States Patent [19]

Tanaka et al.

[11] Patent Number: 4,785,441
[45] Date of Patent: Nov. 15, 1988

[54] TRACKING ERROR CORRECTION APPARATUS UTILIZING PHASE DIFFERENCE INFORMATION DERIVED FROM FOUR PHOTOCELLS

[75] Inventors: Shinichi Tanaka, Kyoto; Haruo Isaka; Hiroshi Yasuda, both of Hirakata; Toshiki Itoi, Shiki, all of Japan

[73] Assignee: Matsushita Electric Industrial Co., Ltd., Osaka, Japan

[21] Appl. No.: 4,139

[22] Filed: Jan. 16, 1987

[30] Foreign Application Priority Data

Jan. 16, 1986 [JP] Japan .................................. 61-6711

[51] Int. Cl.[4] .............................................. G11B 7/00
[52] U.S. Cl. ........................................ 369/44; 369/46
[58] Field of Search .................................. 369/43–47; 250/201 DF; 358/342

[56] References Cited

U.S. PATENT DOCUMENTS 4,375,088  2/1983  de Haan et al. ................. 369/44 X
4,541,082  9/1985  Horkoshi et al. ..................... 369/44

Primary Examiner—Robert L. Richardson
Attorney, Agent, or Firm—Wenderoth, Lind & Ponack

[57] ABSTRACT

Disclosed herein is an optical information reproducing apparatus having a phase difference tracking system which is free from an influence of a tangential phase difference of output signals from a photodetector. The photodetector comprises first through fourth photocells which are respectively disposed at first through fourth quadrants defined by a first straight line parallel to an information track image and a second straight line perpendicular to the first straight line. Output signals of the first and second photocells are delayed for a specified time by respective first and second delaying circuits. Output signals of the first delaying circuit and the third photocell are added by a first adder, and output signals of the second delaying circuit and the fourth photocell are added by a second adder. A phase comparator produces a tracking error signal from a phase difference between output signals of the first and second adders. Alternatively, a first phase comparator produces a phase difference between the output signals of the first and second photocells, and/or a second comparator produces a phase difference between the output signals of the third and fourth photocells. At least one of output signals of the first and second comparator is used for producing a tracking error signal.

10 Claims, 4 Drawing Sheets

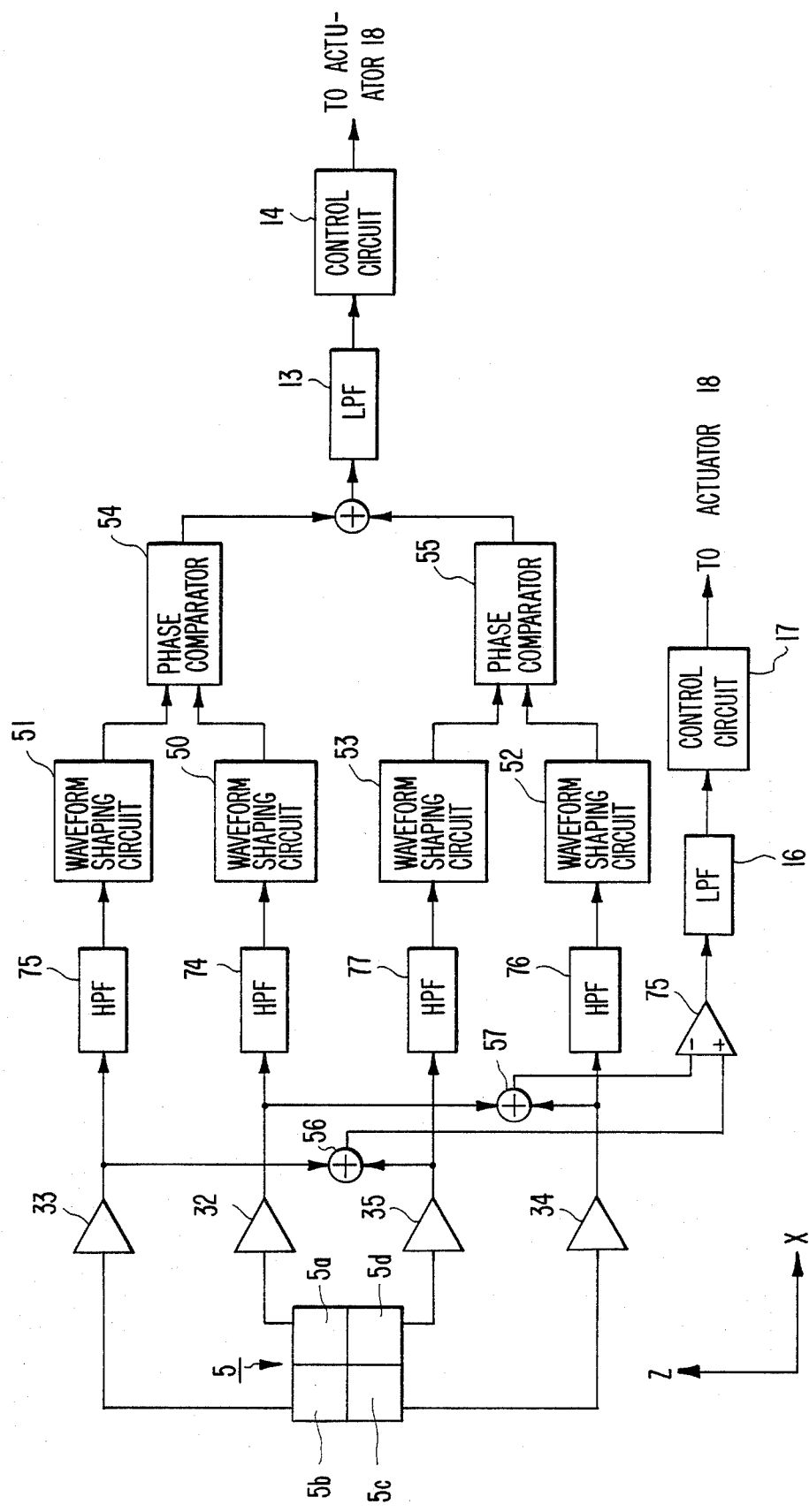

TRACKING ERROR CORRECTION APPARATUS UTILIZING PHASE DIFFERENCE INFORMATION DERIVED FROM FOUR PHOTOCELLS

BACKGROUND OF THE INVENTION

1. Field of the Invention

This invention relates to an optical information reproducing apparatus which optically reads an information from a recording medium, and more particularly to its tracking control.

2. Description of the Prior Art

There is a well known method to carry out tracking control required for an optical information reproducing apparatus, in which two-divided parts of a photodetector differentially detects, an unbalanced quantity distribution of reflected light from an information track to fetch signals corresponding to a tracking error. Such a tracking error detecting method is disclosed, for example, in U.S. Pat. No. 4,059,841. The method, however, has a problem that the tracking control tends to be unstable due to a variation of offset of the tracking error signals caused by an inclination of the recording medium or a displacement of an image on the photodetector.

There is also a well known method which divides a photodetector into four quadrants and detects a tracking error by a phase difference between a signal corresponding to a sum of quantities of lights incident on the first and third quadrants and a signal corresponding to a sum of quantities of lights incident on the second and fourth quadrants. (This method will be hereinafter called "phase difference tracking method".) This phase difference tracking method is disclosed, for example, in Japanese Pat. Appln. of laid-open No. 52-93222. The method can substantially solve the problem previously mentioned. However, it has still a problem that, when reading an information from a recording medium in which the information is recorded as irregularities on a surface with a phase depth less than a quarter wave length, a displacement of an image on the photodetector causes a variation of offset of the tracking error signal, resulting in a tendency to unstable tracking control. We inventors discovered that the problem was due to the following reason.

When the far field image of a light spot formed on a photodetector is divided into four quadrants by a first straight line substantially parallel to a direction in which an information track is extended and a second straight line substantially perpendicular to the direction, there is a phase difference between quantity changes of light incident on the first and second quadrants located on one side to the second line and of light incident on the third and fourth quadrants located on the other side. Since the phase difference occurs with respect to the tangential direction of the information track in the far field image, it will be hereinafter called "tangential phase difference". When an information is recorded in a recording medium as irregularities of a surface with a phase depth of an integral number times a quarter wave length, the tangential phase difference becomes zero when focussing. But a defocussing causes a tangential phase difference corresponding to a defocussed quantity. On the other hand, when the pit phase depth deviates from an integral number times a quarter wave length, the tangential phase difference does not become zero even when accurately focussing. This causes an offset in the tangential phase difference. The offset in the tangential phase difference varies depending on the deviation of the pit phase depth. When the far field image is symmetrically formed with respect to the first and second straight lines, the detection of the phase difference between the sum of outputs from the first and third quadrants and the sum of outputs from the second and fourth quadrants causes the tangential phase difference to be canceled and not to become the offset of the tracking error signal.

However, if the far field image formed on the photodetector is asymmetrically displaced with respect to the first straight line, the tangential phase difference is not canceled to become the offset of the tracking error signal. Especially, when the pit phase depth is, less than a quarter wave length, the offset of the tracking error signal varies in a direction to increase the tracking error. A bias of an objective lens in the radial direction causes the offset of the tracking error signal develop to cause a positive feedback so as to further expand the bias. Thus, if the tracking control is released, the tracking control system runs away and the carriage transferring the optical head also runs away.

SUMMARY OF THE INVENTION

An object of the present invention is to provide an optical information reproducing apparatus in which the offset of tracking error signal varies little even if the image on a photodetector is displaced when reading an information from a recording medium where the information is recorded as succession of pits which have a phase depth different from an integral number times a quarter wave length.

In order to obtain the above object, the optical information reproducing apparatus by the present invention is comprised as follows. The far field image of a light spot by a detecting light from a recording medium is divided into four quadrants by a first straight line substantially parallel to a direction in which an information track is extended and a second straight line substantially perpendicular to the direction so that four photocells can receive lights incident on the four quadrants respectively. A tracking error is detected according to at least one of two phase differences: a phase difference between outputs from the photocells at the first and second quadrants located on one side divided by the second straight line; and a phase difference between outputs from the photocells at the third and fourth quadrants located on the other side divided by said second straight line. Alternatively, a tracking error is detected according to a phase difference between a sum of a signal, which is outputted from the photocell at the first quadrant photocell and delayed for a specified time and a signal which is outputted from the photocell at the third quadrant photocell and a sum of a signal, which is outputted from the photocell at the second quadrant photocell and delayed for a specified time and a signal which is outputted from the photocell at the fourth quadrant photocell.

Any deviation in the offset of tracking control signal gives no adverse effect on tracking control even if the far field image of the spot light on the photodetector is displaced. This is because the tangential phase difference causes no influence.

BRIEF DESCRIPTION OF THE DRAWING

FIGS. 2, 3 and 4 are block diagrams showing major parts of other preferred embodiments of this invention.

DESCRIPTION OF THE PREFERRED EMBODIMENT

Figure 1:
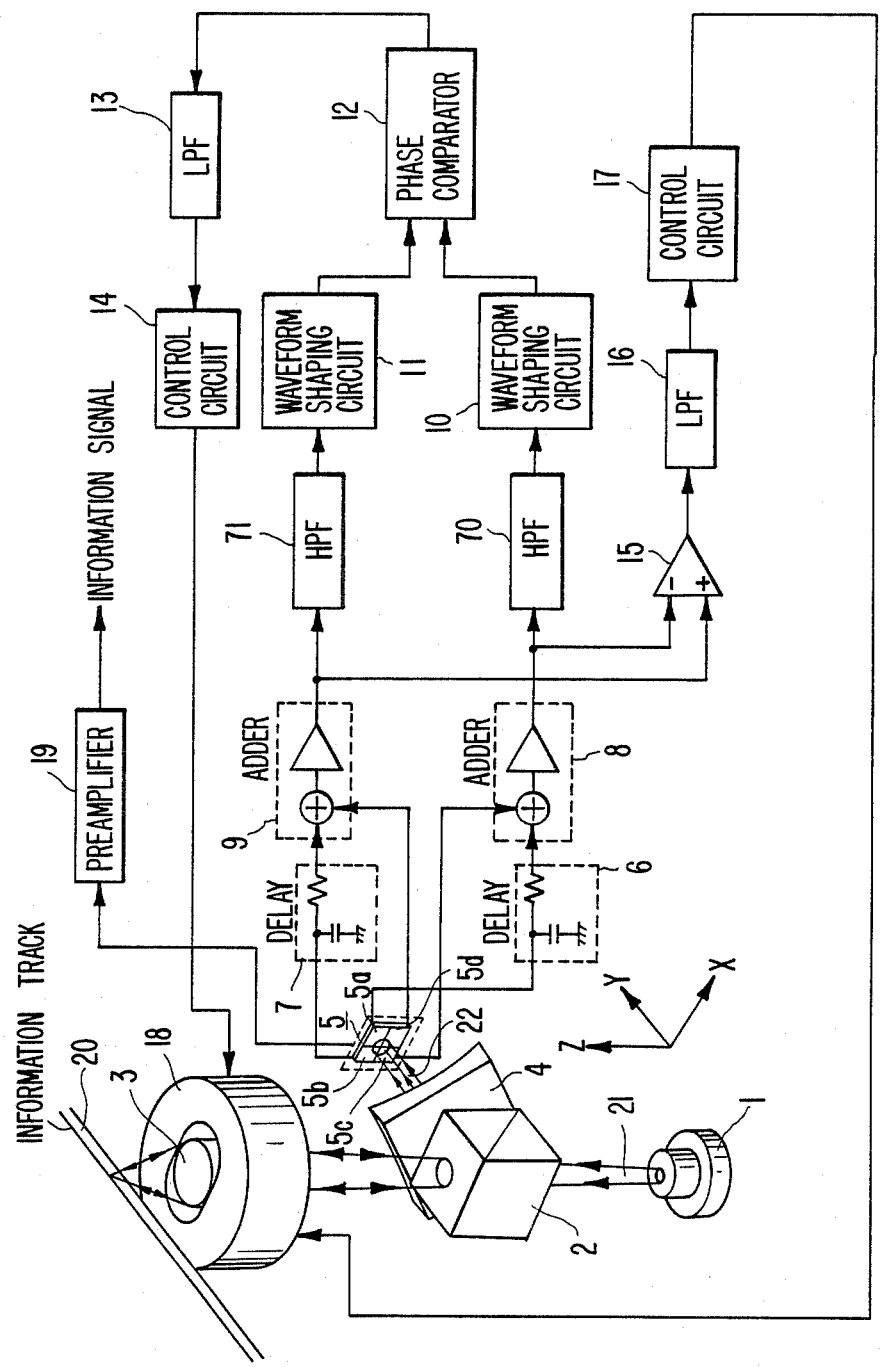
FIG. 1 is a block diagram showing a preferred embodiment of this invention.

In FIG. 1, an irradiation beam 21 radiated from a semiconductor laser 1 and passed through a beam splitter 2 is converged on a recording medium 20 by an objective lens 3 to form a light spot. The reflected light from the recording medium 20 is collected by the objective lens 3 to be a detecting beam 22. The detecting beam 22 is reflected by the beam splitter 2 and separated from the irradiation beam 21. The detecting beam 22 is provided with astigmatism by a cylindrical lens 4, and then forms a far field image of the light spot on a photodetector 5. The photodetector 5 is divided into four quadrants by two straight lines parallel to Z and X directions in the figure, and receives respective parts of the far field image incident on the four quadrants by photocells 5a, 5b, 5c and 5d respectively to output signals corresponding to the received light quantity.

Assume that in an information track, an information is recorded as succession of pits with a phase depth less than a quarter wave length, and on the photodetector 5 a direction in which the information track extendedly exists is imaged in the direction of Z in the figure. In this case, when a correctly focussed light spot scans the information track, a phase difference is produced between the output signals of the first quadrant photocell 5a and the second quadrant photocell 5b, and those of the third quadrant photocell 5c and the fourth quadrant photocell 5d. This means that an offset of the tangential phase difference is produced. Here, assume that the output signals from photocells 5a and 5b are in advance in phase of those from photocells 5c and 5d.

Delaying circuits 6 and 7 delay the output signals from photocells 5a and 5b so as to cancel the offset of the tangential phase difference. An adder 8 adds an output signal current from the delay circuit 6 and that from the photocell 5c, and converts the resultant current to a voltage. An adder 9 adds an output signal current from the delaying circuit 7 and that from the photocell 5d, and converts the resultant current to a voltage. A phase comparator 12 can detect tracking error by comparing phases of the output signals of the adder 8 and the adder 9.

Before this phase comparison, high frequency componets are extracted by means of high-pass filters 70 and 71 for removing low frequency noises from the recording medium, and shaped in waveform by means of waveform shapers 10 and 11 for making the phase comparison easy.

In such a manner, the offset of the tangential phase difference is removed by the delaying circuits 6 and 7, thus providing a correct detection of tracking error even if the far field image is displaced on the photodetector 5. A low-pass filter 13 removes ripple component from the output signal of the phase comparator 12 to obtain a tracking error signal. A tracking control circuit 14 drives an actuator 18 in response to the tracking error signal to control the position of the objective lens 3. Tracking control is performed in this manner.

On the other hand, the detecting beam 22 is provided with astigmatism, allowing a focussing error to be detected by a difference between the quantity of light incident on the photocells 5a and 5c and that incident on the photocells 5b and 5d. Such a focussing error detecting method is known as disclosed in U.S. Pat. No. 4,023,033.

A differential amplifier 15 outputs a signal corresponding to a difference between the output signals of the adder 8 and the adder 9. A low-pass filter 16 removes ripple component from this output signal to obtain a focussing error signal. A focussing control circuit 17 drives the actuator 18 in response to the focussing error signal to control the position of the objective lens 3. Focussing control is performed in this manner. With such a manner, both of the focussing error and tracking error can be detected from the same two signals which are output from the photodetector 5: the former from the level difference, and the latter from the phase difference. Accordingly, the photodetector 5 can be composed of only four photocells and the adders 8 and 9 also be used in common for the two error detections.

On the other hand, a preamplifier 19 amplifies a sum signal of all of the photocells from an injection current into the substrate of the photodetector 5 to obtain an information signal. In this manner, even if the delaying circuits 6 and 7 are each composed of a low-pass filter having capacitor and resistor as shown in the figure, the frequency characteristic of the information signal will not be deteriorated.

Figure 2:
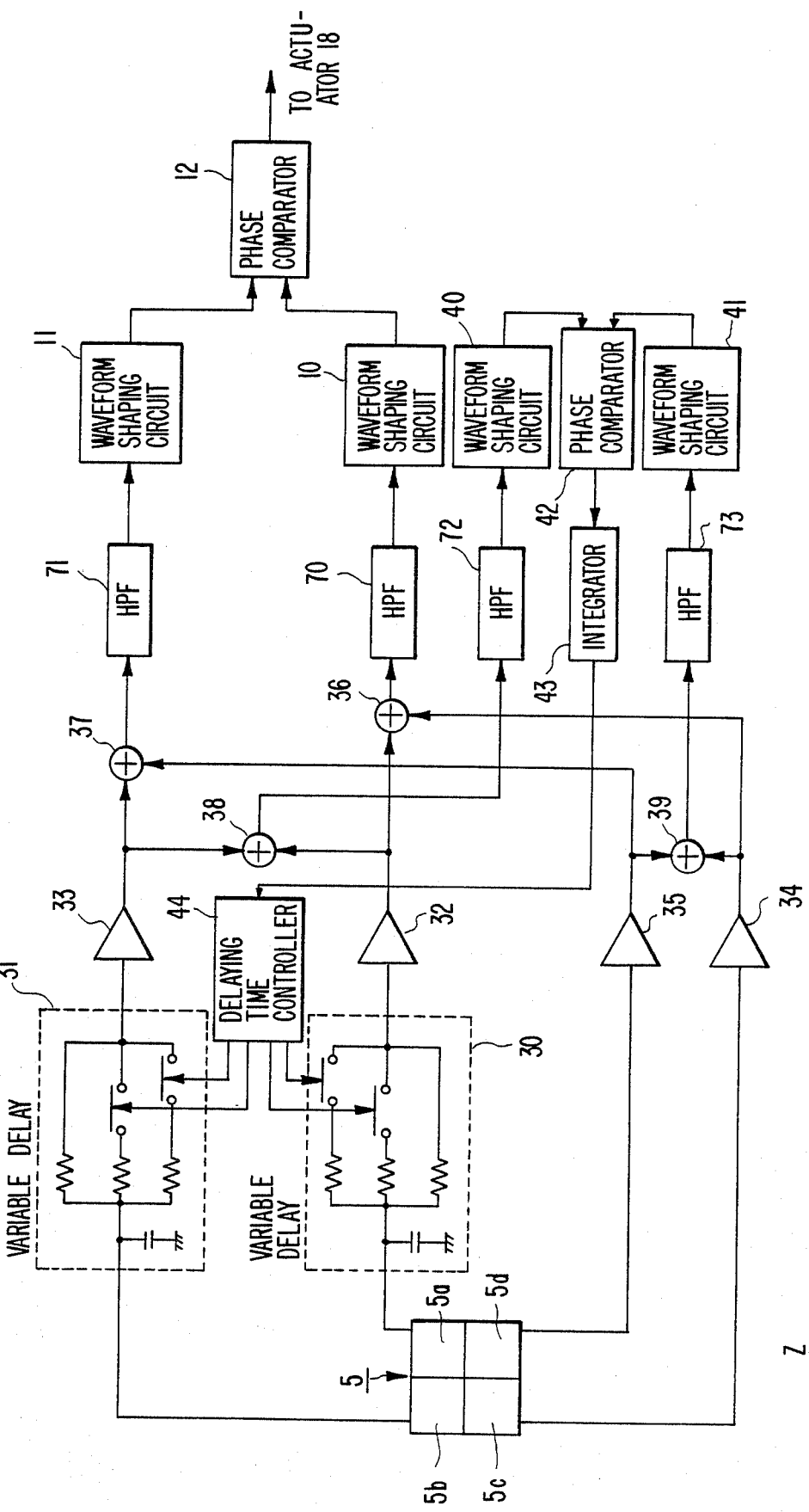

FIG. 2 shows another embodiment of the invention provided with improved delaying circuits. In the embodiment of FIG. 1, the delaying circuits 6 and 7 are adapted such that the output signals of the photocells 5a and 5b are delayed for a specified time. However, the range of the phase depth of the pits on the recording medium is limited because a variation in the tangential phase difference causes a variation in the optimum value of the delaying time. In the embodiment of FIG. 2, the delaying time of the delaying circuits is adaptively controlled so as to obtain the effect of this invention even if the phase depth of the pits varies.

Variable delaying circuits 30 and 31 are adapted such that the delaying time is changed by means of a delaying time controller 44. The delaying time controller 44 controls the delaying time as follows. Buffer amplifiers 32 and 33 convert the respective signal currents from the variable delaying circuits 30 and 31 into voltages. Buffer amplifiers 34 and 35 directly convert the respective signal currents from the photocells 5c and 5d into voltages. Output signals from the buffer amplifiers 32 and 33 are added to each other by an adder 38, and output signals from the buffer amplifiers 34 and 35 are added to each other by an adder 39. When the tangential phase difference is not optimally canceled by the variable delaying circuits 30 and 31, a phase difference remains in output signals from the adders 38 and 39. Thus, this phase difference of the output signals from the adders 38 and 39 detected by means of a phase comparator 42 corresponds to an error in the delaying time of the variable delaying circuits 30 and 31.

High pass filters 72 and 73, and waveform shapers 40 and 41 function similarly to the high pass filters 70 and 71, and the waveform shapers 10 and 11 in FIG. 1. An integrator 43 integrates a signal corresponding to the error in the delaying time from the phase comparator 42. When an integrated value at the integrator 43 reaches a specified value, the delaying time controller 44 changes the delaying time of the variable delaying circuits 30 and 31. In this manner, the variable delaying circuits 30 and 31 are controlled so as to precisely cancel the tangential phase difference.

An adder 36 adds the signal which is outputted from the photocell 5a and delayed by the delaying circuit 30 to the output signal from the photocell 5c. An adder 37 adds the signal which is outputted from the photocell 5b and delayed by the delaying circuit 31 to the ouput signal from the photocell 5d. Tracking error is detected from a phase difference between output signals from the adders 36 and 37 similarly to the case in FIG. 1

In this embodiment, in order to provide a better matching of the delaying time of the variable delaying circuits 30 and 31, the delaying time of the circuits 30 and 31 is designed to be changed discretely. If a sufficient matching of the delaying time is provided, the delaying circuits may be adapted such that the delaying time can be continuously changed.

Although the tangential phase difference is precisely canceled in the above embodiment, it is not always necessary to precisely cancel the tangential phase difference. The tangential phase difference may be reduced to such an extent that the unstability of tracking control is eliminated. When, in particular, the pit phase depth is less than a quarter wave length, the offset of the tracking error signal resulting from the movement of the far field image on the photodetector 5 according to the movement of the objective lens for tracking often causes the tracking control to be in unstable condition as previously described. Accordingly the delaying time of the variable delaying circuits 30 and 31 may be adjusted so as to excessively cancel the offset of the tangential phase difference. In this manner, the offset of the tracking error signal developing when the objective lens 3 is biased for tracking control is placed in a direction of negative feedback so as to cancel the bias of the objective lens 3. Thus, even if the tracking control is released, the tracking control system and the carriage will not run away.

Figure 3:
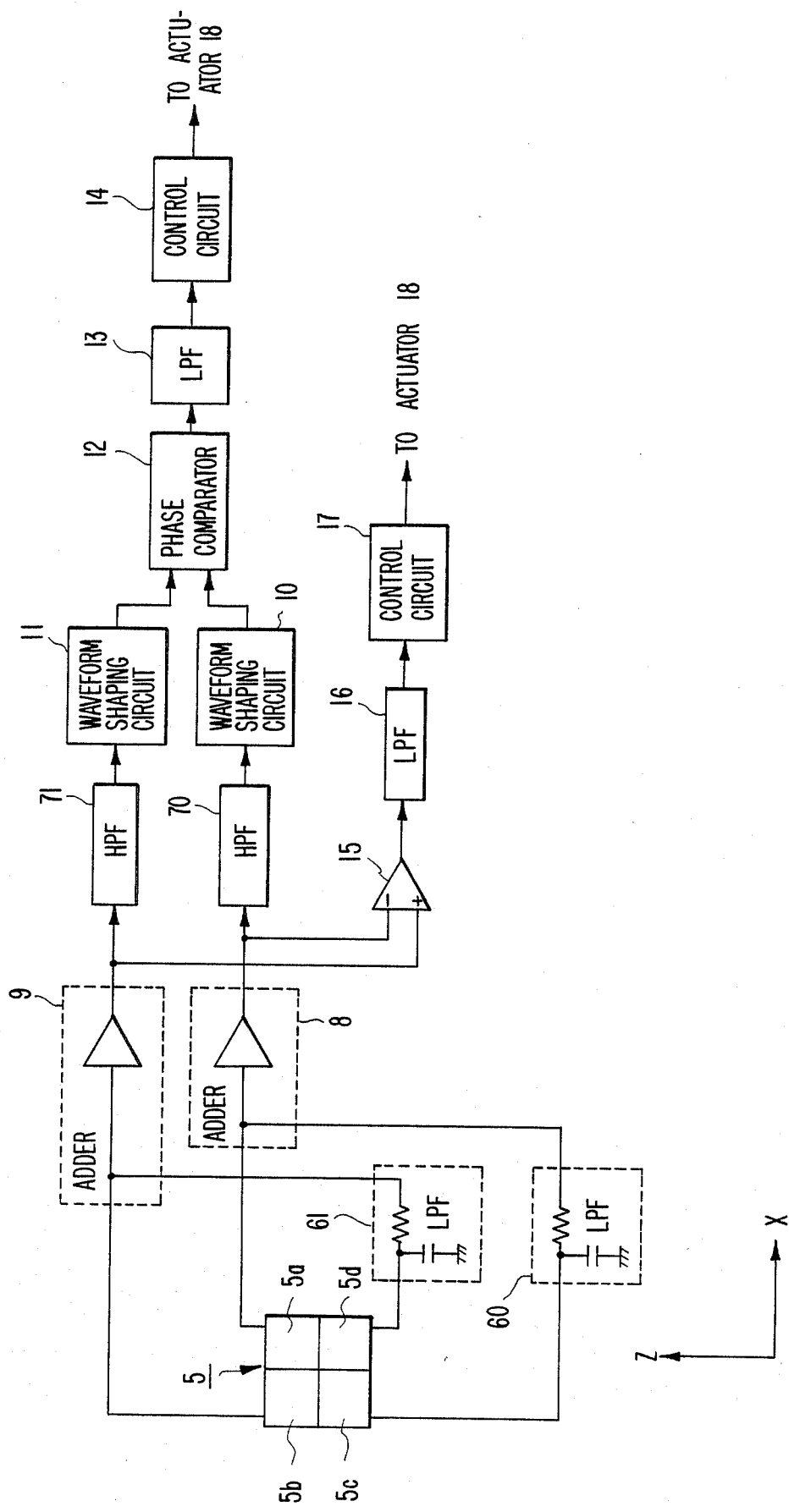

FIG. 3 shows a block diagram of a major part of still another embodiment of the invention. In the embodiments of FIGS. 1 and 2, a delaying circuit is provided to cancel the tangential phase difference, while this FIG. 3 embodiment removes the influence of the tangential phase difference by a different manner. That is, this embodiment detects a tracking error by only the phase difference between the quantity change of light incident on the first quadrant and that of light incident on the second quadrant.

Considering the fact that the far field image is formed almost symmetrically with respect to the second straight line dividing the photodetector 5, it is evident that, when a phase difference corresponding to a tracking error is produced between the quantity change of light incident on the first and third quadrants and that of light incident on the second and fourth quadrants, the same phase difference appears between the quantity change of light incident on the first quadrant and that of light incident on the second quadrant. Detection of the tracking error by the phase difference between the quantity change of light incident on the first quadrant and that of light incident on the second quadrant totally eliminates the influence of the tangential phase difference, allowing the offset of the tracking error detection to be removed.

Specific operation of the embodiment of FIG. 3 is as follows. Low-pass filters 60 and 61 remove such high frequency components as to pass through the high-pass filters 70 and 71 from the output signals of the third quadrant photocell 5c and the fourth quadrant photocell 5d respectively. The adder 8 adds an output signal current from the low-pass filter 60 and an output signal current from the first quadrant photocell 5a, and converts the sum signal current into a voltage. The adder 9 adds an output signal current from the low-pass filter 61 and an output signal current from the second quadrant photocell 5b, and converts the sum signal current into a voltage. Output signals from the adders 8 and 9 are passed through the high-pass filters 70 and 71 so that low frequency components are removed, and then are shaped in waveforms by the waveform shapers 10 and 11.

In this manner, the phase difference between output signals of the waveform shapers 10 and 11 substantially becomes the same as the phase difference between the quantity change of light incident on the first quadrant and that of light incident on the second quadrant. This is because the signal components corresponding to the quantities of lights incident on the third and fourth quadrants are almost removed by the low-pass filters 60 and 61, and by the highpass filters 70 and 71. Thus, the phase difference corresponding to the tracking error can be detected from the output signals of the waveform shapers 10 and 11 by the phase comparator 12.

Since such a detection causes the tracking error to be immune to the tangential phase difference, even if the objective lens moves for tracking control the variation in the offset of the tracking error becomes small as previously described.

The output signal of the adder 8 contains a sum of low frequency components of the output signals from the photocells 5a and 5c, and the output signal of the adder 9 contains a sum of low frequency components of the output signals from the photocells 5b and 5d. Thus, focussing error can be detected by the level comparator 15 from the output signals of the adders 8 and 9 similarly to the case in FIG. 1.

FIG. 4 shows a block diagram of a major part of yet another embodiment of the invention. In FIG. 4, buffer amplifiers 32, 33, 34 and 35 convert the output signal currents from the photocells 5a, 5b, 5c and 5d into voltages. Output signals from the buffer amplifiers 32 and 33 are passed through high pass filters 74 and 75 so that low frequency components are removed, shaped in waveform by waveform shapers 50 and 51, and then compared of their phases by a phase comparator 54. In this manner, tracking error is detected similarly to the case in FIG. 3.

On the other hand, tracking error is similarly detected also by buffer amplifiers 34 and 35, high-pass filters 76 and 77, and a phase comparator 55. By adding the output signals, varying according to a tracking error, from the phase comparators 54 and 55, a more stable and less noisy tracking error signal than the case in FIG. 3 can be obtained. Further, since the tracking error is independently detected by the phase difference between the quantity changes of lights incident on the first and second quadrants and by the phase difference between the quantity changes of lights incident on the third and fourth quadrants, the influence of the tangential phase difference can be eliminated. Therefore, the variation in the offset of tracking error detection can be made small even if the objective lens is displaced for tracking control.

As previously described, the present invention specifically provides an apparatus to reduce the variation in the offset of tracking error developing when the objective lens is displaced due to eccentricity and the like of a recording medium for tracking error detection by the phase difference tracking method, on the basis of a discovery that the variation results from the tangential phase difference. Any modification falls within the spirit and scope of this invention insofar as such a modification is based on the concept explained in connection with the above embodiments.

What is claimed is:

1. An optical information reproducing apparatus for optically reading an information recorded as a succession of pits formed on an information track on a recording medium, comprising:

means for forming a light spot on said recording means;

converging means for collecting a reflected light from said light spot to form a far field image of said light spot;

a photodetector for receiving said far field image, said photodetector comprising first through fourth photocells respectively disposed at first through fourth quadrants defined by a first straight line parallel to a direction in which said information track is projected and a second straight line perpendicular to said first straight line, where said first straight line defines a border between said first and fourth quadrants and between said second and third quadrants, and said second straight line defines a border between said first and second quadrants and between said third and fourth quadrants;

means for producing an information signal corresponding to said information from an output signal of said photodetector;

tracking error detecting means comprising: first delaying means for delaying an output signal of said first photocell for a specified time; second delaying means for delaying an output signal of said second photocell for said specified time; first adding means for adding an output signal of said first delaying means and an output signal of said third photocell; second adding means for adding an output signal of said second delaying means and an output signal of said fourth photocell; and phase comparison means for producing, as a tracking error signal, a phase difference signal corresponding to a difference of phases of output signals of said first and second adding means; and means responsive to said tracking error signal for driving said light spot forming means to correct a tracking error.

2. The optical information reproducing apparatus as claimed in claim 1, wherein each of said first and second delaying means comprises a primary low-pass filter.

3. The optical information reproducing apparatus as claimed in claim 1, wherein each of said pits has a phase depth less than a quarter wave length, and wherein said specified time by said delaying means is set larger than a phase difference between an output signal from a photocell arranged in one side divided by said second straight line and an output signal from a photocell arranged in the other side when said light spot is correctly focused.

4. The optical information reproducing apparatus as claimed in claim 1, further comprising: optical means provided in said light converging means for introducing astigmatism in said far field image; focussing error detecting means for producing a focussing error signal from a level difference between low frequency components of the output signals of said first and second adding means; and means responsive to said focussing error signal for driving said light spot forming means to correct a focussing error.

5. The optical information reproducing apparatus as claimed in claim 1,, wherein each of said first and second deplaying means is a variable delaying means, and wherein said apparatus further comprising delaying time control means for controlling a delaying time of said variable delaying means according to a phase difference between a sum of the output signals of said first and second delaying means and a sum of the output signals of said third and fourth photocells.

6. An optical information reproducing apparatus for optically reading an information recorded as a succession of pits formed on an information track on a recording medium, comprising:

means of forming a light spot on said recording means;

converging means for collecting a reflected light from said light spot to form a far field image of said light spot;

a photodetector for receiving said far field image, said photodetector comprising first through fourth photocells respectively disposed at first through fourth quadrants defined by a first straight line parallel to a direction in which said information track is projected and a second straight line perpendicular to said first straight line, where said first straight line defines a border between said first and fourth quadrants and between said second and third quadrants, and said second straight line defines a border between said first and second quadrants and between said third and fourth quadrants;

means for producing an information signal corresponding to said information from an output signal of said photodetector;

tracking error detecting means for producing a tracking error signal from at least one of a phase difference between output signals of said first and second photocells and a phase difference between output signals of said third and fourth photocells; and means responsive to said tracking error signal for driving said light spot forming means to correct a tracking error.

7. The optical information reproducing apparatus as claimed in claim 6, wherein said tracking error detecting means comprises: a first low-pass filter for passing a low frequency component of an output signal of said third photocell; a second low-pass filter for passing a low frequency component of an output signal of said fourth photocell; first adding means for adding an output signal of said first photocell and an output signal of said first low-pass filter; second adding means for adding an output signal of said second photocell and an output signal of said second lowpass filter; and phase comparison means for producing, as said tracking error signal, a phase difference signal between output signals of said first and second adding means.

8. The optical information reproducing apparatus as claimed in claim 7, further comprising: optical means provided in said converging means for introducing astigmatism into said far field image; focussing error detecting means for producing a focussing error signal from a level difference between low frequency components of the output signals of said first and second adding means; and means responsive to said focussing error signal for driving said light spot forming means to correct a focussing error.

9. The optical information reproducing apparatus as claimed in claim 6, wherein said tracking error detecting means comprises: first phase comparison means for producing a first phase difference signal corresponding to a phase difference between output signals of said first and second photocells; second phase comparison means for producing a second phase difference signal corresponding to a phase difference between output signals of said third and fourth photocells; and adding means for adding said first and second phase difference signals thereby to obtain said tracking error signal.

10. The optical information reproducing apparatus as claimed in claim 9, further comprising: optical means provided in said converging means for introducing astigmatism into said far field image; focussing error detecting means for producing a focussing error signal from a level difference between a sum of the output signals of said first and third photocells and a sum of the ouput signals of said second and fourth photocells; and means responsive to said focussing error signal for driving said light spot forming means to correct a focussing error.

* * * * *